Dec. 19, 1922. 1,439,002.
F. H. JOURDAN.
JOINT FOR STEERING WHEELS.
FILED MAR. 7, 1921.

Inventor
Frederick H. Jourdan
By Frank C. Gore
his Attorney

Witness

Patented Dec. 19, 1922.

1,439,002

UNITED STATES PATENT OFFICE.

FREDERICK H. JOURDAN, OF EVANSVILLE, INDIANA.

JOINT FOR STEERING WHEELS.

Application filed March 7, 1921. Serial No. 450,250.

*To all whom it may concern:*

Be it known that I, FREDERICK H. JOURDAN, a citizen of the United States, residing at Evansville, in the county of Vanderburgh and State of Indiana, have invented certain new and useful Improvements in Joints for Steering Wheels, of which the following is a specification.

This invention relates to steering wheels for automobiles and other vehicles and it has for its objects, first, the provision of a wheel made in sections glued or cemented at their joints and so formed or cut where the ends of the sections join each other that the sections will resist their tendency to separate in a direction radially crosswise of the wheel should the glue or cement not hold; second, to provide a novel joint for the sections of a wheel which is formed of wood, the joint being particularly adapted for use on a steering wheel of an automobile or the like.

The preferred embodiment of the invention is fully described hereinafter and shown in the accompanying drawings and the novel features of the steering wheel and joint are set forth in the appended claims.

Figure 1:
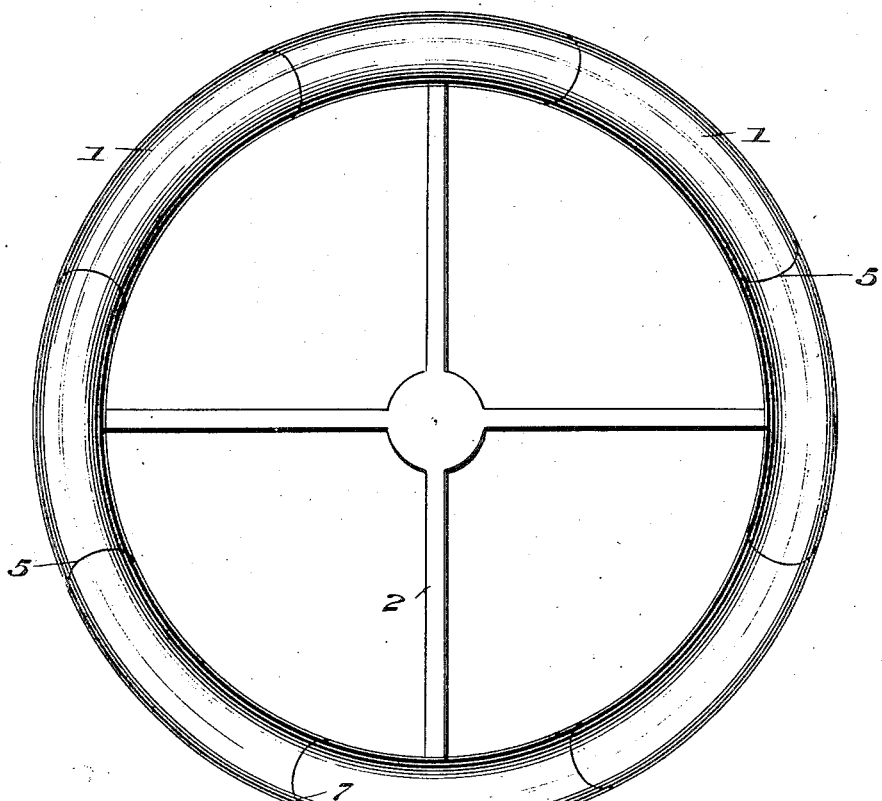
Figure 1 is a plan view of a steering wheel made according to my invention.

The steering wheel shown in Fig. 1 may comprise as many wooden sections 1 as desired but it is preferably formed of eight sections which are connected by the novel joint I have devised. The wheel is shown as carried by any suitable frame or spider 2 for its connection to the steering shaft or column of the automobile but said spider constitutes no part of my invention.

Figure 2:
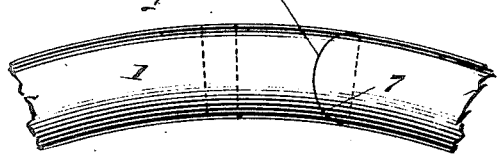
Fig. 2 is a detail plan view of one of the joints, dotted lines representing features which are covered up.
Figure 3:
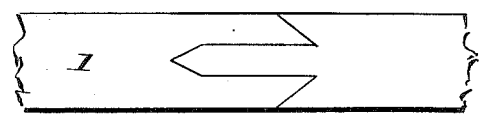
Fig. 3 is an outer edge view of one of the joints.
Figure 4:
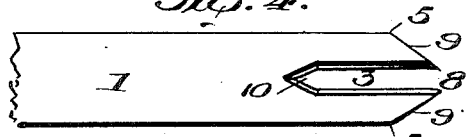
Fig. 4 is an inner edge view of the mortised section of the joint.
Figure 5:
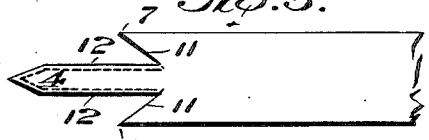
Fig. 5 is an inner edge view of the tenoned section of the joint.
Figure 6:
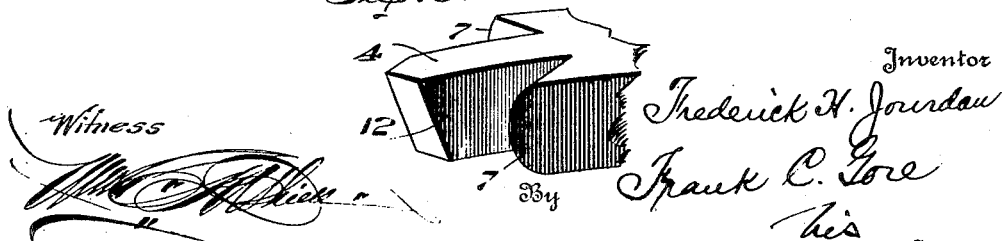
Fig. 6 is a detail perspective of the tenoned section of the joint.

One end of each section 1 is provided with a mortise 3 and the other end of each section has a tenon 4. The sections 1 being rounded, for instance, oval or elliptical in cross section, as usual, the edges of the mortised end of the section, in each instance, are concave as shown at 5 and the edges of the tenoned section are convex as shown at 7 and fit into or match with the rounded edges 5 as shown in Figs. 1 and 2.

The ends of the mortised section are beveled from the points 8 to 5 as indicated at 9. The inner end of the mortise 3 is formed with converging walls as shown at 10. The width of the mortise 3 at the inner face of the section 1 is narrower than the width thereof at the outer face, thus forming a taper for a purpose which will presently appear.

The tenon 4 is shaped to correspond to the mortise 3, being provided with converging walls 11 which receive the beveled ends on the mating section 1, the bevels 9 engaging the walls 11. The inner face of the tenon 4 is narrower than the outer face and the walls 12 taper to fit the walls of the mortise 3.

The overlap or scarf joint provided by the walls 9 and 11, in connection with the mortise and tenon, affords a very strong resistance to lateral breaking or bending. The tapering of the walls of the mortise 3 and walls 12 of the tenon 4 prevents the disconnection of the sections of the wheel crosswise of the latter should the glue or cement become loosened or not hold. Any suitable glue, cement or adhesive is used to coat the parts of the joint where faces thereof contact.

Each of the sections 1 may be made out of a single piece of wood, if desired.

I claim:

1. A butt end joint for steering wheels or the like comprising a section provided with a single mortise having walls with beveled ends or faces flanking the entrance to the mortise and converging walls at the inner end of the mortise, and a single tenoned section having parts corresponding to and fitting the parts of the mortised section.

2. A butt end joint for steering wheels or the like comprising a section provided with a single mortise having walls with beveled ends or faces flanking the entrance to the mortise and converging walls at the inner end of the mortise, and a single tenoned section having parts corresponding to and fitting the parts of the mortised section, the mortise and tenon being provided with converging sides whereby the separation of the joint laterally of itself is prevented.

In testimony whereof I affix my signature.

FREDERICK H. JOURDAN.